Sept. 15, 1925.
H. RHOADS
WEEDING DEVICE
Filed Aug. 20, 1924
1,553,719
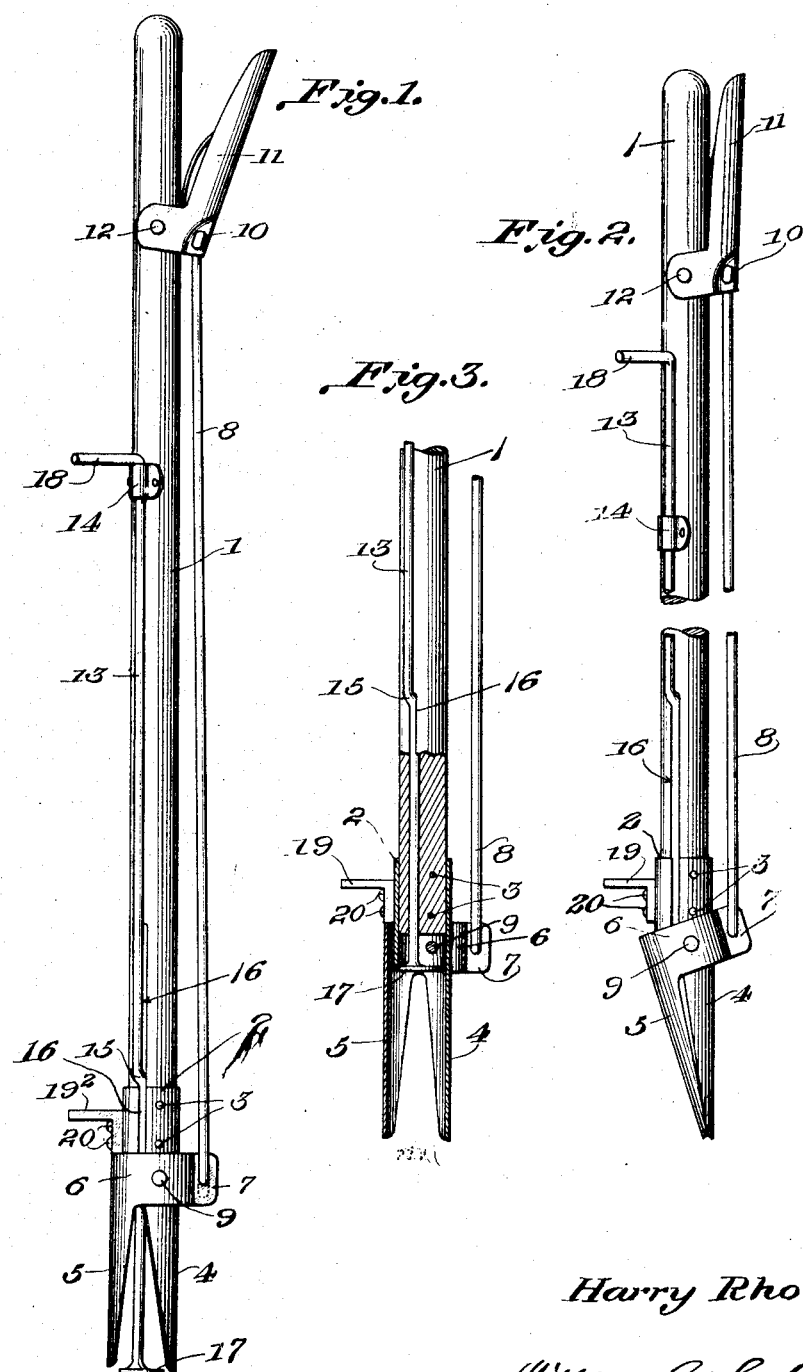
Inventor
Harry Rhoads.
By William C. Linton
Attorney Patented Sept. 15, 1925.

1,553,719

UNITED STATES PATENT OFFICE.

HARRY RHOADS, OF SIDNEY, OHIO.

WEEDING DEVICE.

Application filed August 20, 1924. Serial No. 733,146.

*To all whom it may concern:*

Be it known that I, HARRY RHOADS, a citizen of the United States of America, residing at Sidney, in the county of Shelby and State of Ohio, have invented certain new and useful Improvements in Weeding Devices; and I do hereby declare that the following is a full, clear, concise, and exact description of the invention, such as will enable others skilled in the art to which it appertains to make and use the same.

This invention relates to improvements in weeding devices, having for an object to provide a weeding device utilizing a novel arrangement of earth penetrating means adapted to be engaged about the roots of a weed to be extracted at a depth and in a manner such as to effect positive removal of the same upon withdrawal of the weeder from the earth, hence, totally destroying the growth.

It is also an object of the invention to provide the device with means which will permit of convenient operation of the same by a user and also, an ejector means whereby the extracted weed may be ejected from the weeder jaws.

Other objects of the invention will be in part obvious, and in part pointed out hereinafter.

In order that the invention and its mode of operation may be readily understood by persons skilled in the art, I have in the accompanying illustrative drawings, and in the detailed following description based thereupon, set out one possible embodiment of the same.

In these drawings:—

Figure 1 is a side elevation of the improved weeder device showing the jaws thereof in open position;

Figure 2 is a fragmentary side elevation of the device showing the jaws in their closed position; and, Figure 3 is a fragmentary detail, partly in longitudinal section, through the lower end of the weeder device staff or handle and the earth penetrating and root engaging jaws.

Having more particular reference to the drawings, in connection with which like characters of reference will designate corresponding parts throughout, the improved device may be stated to comprise an elongated handle or staff 1, having a sleeve or collar, formed of metal or other suitable material, 2, fixedly secured to the lower end of the same by means of rivets, screws, or other suitable fastening devices 3. One portion of the lower end of this sleeve or collar 2 is formed with a substantially longitudinally disposed jaw 4, the same being preferably formed integral with the collar 2 and being substantially semi-circular in cross section, while it tapers towards its lower or free end whereby to provide an effectual earth penetrating means.

A second jaw 5 is provided in the device, the same being shaped and formed complementally to the jaw 4, but having a semi-circular collar 6 formed upon the upper portion thereof and extended laterally therefrom, as clearly shown in the Figures 1 and 2, the collar being slit and having off-set free extremities 7 which are provided with aligning apertures adapted to receive one end of an operating rod 8 therein, hereinafter more fully described. The laterally extending collar with its arms of off-set extremites 7 is adapted to be pivotally mounted with respect to the immovable jaw 4 and to accomplish this, a pivot pin, of suitable design, indicated by the numeral 9, is passed through the opposite portions of the slit collar 6 and through adjacent portions of the lower end of the collar 2, fixedly secured through the medium of the rivets 3 to the lower end of the staff 1. Thus, it will be understood that in its normal position, the movable jaw 5 will be arranged as shown in the Figure 1, while with pivotal movement of the same towards the immovable jaw 4, it will assume that position as shown in Figure 2. In this latter position, the weeder device provides a substantially conical-like root and weed retaining device, closed to such an extent as to positively prevent the escape of any material portions of the weed roots during an extracting or weed pulling operation. Furthermore, it will be understood that because of the elongated or bill-like tapered jaws 4 and 5, the same when in their relative open positions, as shown in the Figure 1, will be permitted to readily enter or penetrate the earth with the imparting of sufficient downward thrust or pressure to the same.

To effect moving of the pivotal or movable jaw 5 to its several positions, as hereinbefore explained, the rod 8 is provided, such rod extending longitudnally of the staff 1 and having its free or upper end pivoted as indicated at 10 to the adjacent portion of a gripping handle 11 pivotally mounted upon the upper portion of the staff 1, as indicated at 12. By this arrangement, it is obvious that with movement of the grip handle 11 towards the handle portion of the staff 1, an upward pull will be imparted to the off-set arms 7 of the slit collar 6 and in consequence, the movable jaw 5 will be swung upon its pivot pin 9 towards the immovable jaw 4 until it assumes that position as is shown in the Figure 2, or approximately so.

It is also desirable in weeding devices of this character that means be provided for ejecting the extracted weeds from the jaws of the instrument and to this end, I provide upon the staff 1, a longitudinally extending slidable rod 13, passing strap brackets or other suitable guide devices 14 over a portion of the rod 13, while the lower end thereof is bent upon itself or laterally off-set, as indicated by the numeral 15, and is then extended or received in a groove 16 disposed longitudinally of the lower portion of the staff 1 and terminating at the lower end of such staff. This laterally off-set portion of the rod 13 carries a head or ejector device proper designated by the numeral 17, whose size is such as will permit its snug reception within the lower portion of the circular collar 2, as is shown in the Figure 3. The upper end of the rod 13 is preferably provided with a right angularly disposed handle portion 18 and it is obvious that this handle portion provides convenient means whereby to engage the rod and to impart a downward thrust thereto in order that the ejector head 17 shall be moved downwardly with respect to the collar 2, thereby ejecting or dislodging the extracted root and earth from the several jaws 4 and 5 which are now moved to their open positions, as shown in the Figures 1 and 3. In this way, it will be appreciated that the necessity of removing the extracted weeds and earth from the jaws 4 and 5 by hand will be avoided, and in consequence, the practicability and efficiency of the device will be materially enhanced.

With a view towards providing means for facilitating the application of downward pressure to the jaws 4 and 5 in order that they shall penetrate the earth and properly position themselves about the root or lower portion of a weed to be extracted, I may and preferably do provide the substantially right-angularly disposed step or foot bracket 19, securing the same through the medium of rivets 20, or similar devices, to the lower end of the staff 1, adjacent the position of the collar 2 thereon, as is shown. Thus, the device may be forced downwardly into the earth to the desired distance by placement of the foot of a user upon the bracket 19 and the application of downward pressure thereto.

Because of the angular positioning of the jaw 4 with respect to the collar 2, it will be noted that with swinging of the jaw 5 to its closed position, a substantially conical-like earth and root retaining device will be provided, which, in its entirety, will be disposed at a slight angle with respect to the lower end of the staff 1. In this way, escapement of small particles of the extracted weed from the device will be positively eliminated and furthermore, where portions of a weed root extend from the jaws in their closed position, it will be understood that an indirect pull will be imparted from the extended earth imbedded portions to those portions within the closed jaws, and in consequence, they will be readily broken or severed from the main portion without liability of pulling such main portion from the engagement between the jaws 4 and 5.

Manifestly, the construction shown is capable of considerable modification, and such modification as is within the scope of my claims, I consider within the spirit of my invention.

I claim:

1. A weeding device comprising a staff, a tapered jaw, a collar carried upon and integral with said jaw immovably secured to the lower end of the staff, a second jaw having a slit collar formed upon the upper portion thereof encircling the lower portion of said first collar and pivotally connected to the same, said second jaw being opposed in its arrangement with respect to the immovable jaw, a rod disposed longitudinally of the staff and connected at one end to the free ends of said slit collar, and means upon a portion of the staff connected to a portion of said rod for effecting movement of the same whereby to effect pivotal movement of said second jaw.

2. A weeding device comprising a staff, an elongated tapered jaw, a collar carried upon and integral with said jaw immovably secured to the lower end of said staff, a second jaw having a slit collar formed upon the upper portion thereof encircling the lower portion of said first collar and pivotally connected to the same, said second jaw being opposed in its arrangement with respect to the immovable jaw, a rod disposed longitudinally of the staff and connected at its lower end to the free ends of said slit collar, means upon the upper portion of said staff connected to the free end of said rod for effecting movement of the same whereby to effect pivotal movement of said second jaw, and ejector means operable from the upper portion of said staff slidably arranged within and between the upper portions of said jaws.

3. A weeding device comprising a staff, a circular collar fixedly secured to the lower end thereof, a tapered elongated jaw extending from one side of said collar, a slit collar embracing the lower portion of said first collar and pivotally connected thereto, a second and movable jaw integral with the lower portion of said slit collar corresponding in shape and size to said first jaw and opposed in its arrangement thereto, a rod connected to the free extremities of said slit collar, operating means connected to the upper portion of said staff and to the free end of said rod, a second rod slidable longitudinally along a portion of the staff having its lower part off-set and slidably received in a longitudinally disposed groove formed in the lower portion of said staff and opening onto the lower end thereof, and an ejector head carried upon the lower end of said last mentioned rod adapted to be moved longitudinally between said opposed jaws.

In witness whereof I have hereunto set my hand.

HARRY RHOADS.